United States Patent [19]
Petiot

[11] Patent Number: 5,486,039
[45] Date of Patent: Jan. 23, 1996

[54] ELECTRO-HYDRAULIC BRAKING CORRECTOR

[75] Inventor: Jean-Paul Petiot, Marcoussis, France

[73] Assignees: Automobiles Peugeot, Paris; Automobiles Citroen, Neuilly sur Seine, both of France

[21] Appl. No.: 90,956

[22] Filed: Jul. 13, 1993

[30] Foreign Application Priority Data

Jul. 28, 1992 [FR] France .................. 92 09589

[51] Int. Cl.⁶ .................................. B60T 8/18
[52] U.S. Cl. .................. 303/22.6; 303/3; 303/22.8; 303/112
[58] Field of Search ............... 303/3, 15, 16, 303/22.1, 22.2, 22.3, 22.5, 22.8, 22.6; 180/65.1, 165

[56] References Cited

U.S. PATENT DOCUMENTS 3,692,365  9/1972  Demarez et al. ............... 303/3
3,695,735  10/1972 Guettier ........................ 303/22.8
3,814,483  6/1974  Coiner et al. .................. 303/22.6
3,924,902  12/1975 Engle ............................ 303/22.6

FOREIGN PATENT DOCUMENTS 0390621  10/1990  European Pat. Off. .
0398793  11/1990  European Pat. Off. .
583713   12/1946  United Kingdom .

*Primary Examiner*—Matthew C. Graham
*Attorney, Agent, or Firm*—Burns, Doane, Swecker & Mathis

[57] ABSTRACT

An electro-hydraulic braking corrector for electrically powered vehicles is connected between the brake system master cylinder and the hydraulic system of the brake system. This braking corrector includes a device for modifying the hydraulic braking pressure exerted upon an axle as a function of the braking torque of the electric propulsion motor. In addition, the braking force can be modified as a function of the axle load.

4 Claims, 3 Drawing Sheets

5,486,039

ELECTRO-HYDRAULIC BRAKING CORRECTOR

BACKGROUND OF THE INVENTION

The present invention relates generally to the braking system of an electrically powered vehicle. More particularly, this invention concerns an electro-hydraulic compensator for use in the braking system of an electrically powered vehicle.

In an electrically-powered vehicle, the electric motor engine typically has a torque that is practically constant for engine operating speeds, i.e., angular velocities, of from 0 to n rpm. Ordinarily, n most often is on the order of 1500. For engine operating rates greater than n rpm, torque of the motor generally diminishes in proportion to the engine operating rate. Power from the engine behaves differently than torque: the power increases with engine operating rate from 0 to n rpm, but remains constant thereafter.

By using the motor in the braking state, it is possible to recharge the batteries and thus increase vehicle operating range. The resisting torque, however, is practically equal to the engine torque at a given operating rate. Accordingly, resisting torque declines with increasing engine operating rate. Furthermore, the motor braking torque is insufficient to stop a vehicle that requires strong or rapid deceleration. It is therefore necessary to add a conventional hydraulic braking device to an electrically driven car to enhance the available braking torque. However, the sum total of braking actions from the hydraulic braking device and the resisting torque is then variable which leads to problems, especially for the propulsion elements. For example, there is a risk of having wheels lock at slow speeds.

BRIEF SUMMARY OF THE INVENTION

A general object of this invention is to provide an electro-hydraulic braking corrector for an electrically-powered vehicle that will remedy problems of the type mentioned.

This braking corrector comprises means suitable for modifying the hydraulic braking pressure exerted on an axle as a function of the braking torque of the electric motor that propels the vehicle.

The invention is more particularly applicable when the vehicle includes a servo-controlled braking compensator of the slide and link type, where the link is articulated around a shaft. In this embodiment, the articulated slide preferably includes a first arm whose end is tied or connected to the suspension by a spring and a second arm whose end is tied or connected to an adjusting means that is controlled in response to the braking torque of the electric motor which propels the vehicle.

A mobile means that works as a function of the electric motor braking torque may include a controlled torque motor, or a continuous motor, or a step-by-step motor. The motor is preferably controlled by control means responsive to the braking torque of the electric motor. The shaft of the torque motor, of the continuous motor, or of the step-by-step motor carries a pinon that engages with a gear rack. The gear rack, in turn, may be connected to the articulated slide.

BRIEF DESCRIPTION OF THE DRAWINGS

In the nonrestrictive examples discussed below, one way of implementing the corrector according to the invention is illustrated. Many objects and advantages of the present invention will be apparent to those skilled in the art when this specification is read in conjunction with the attached drawings wherein like reference numerals are applied to like elements and wherein.

DETAILED DESCRIPTION OF THE PREFERRED EMBODIMENTS

Figure 1:
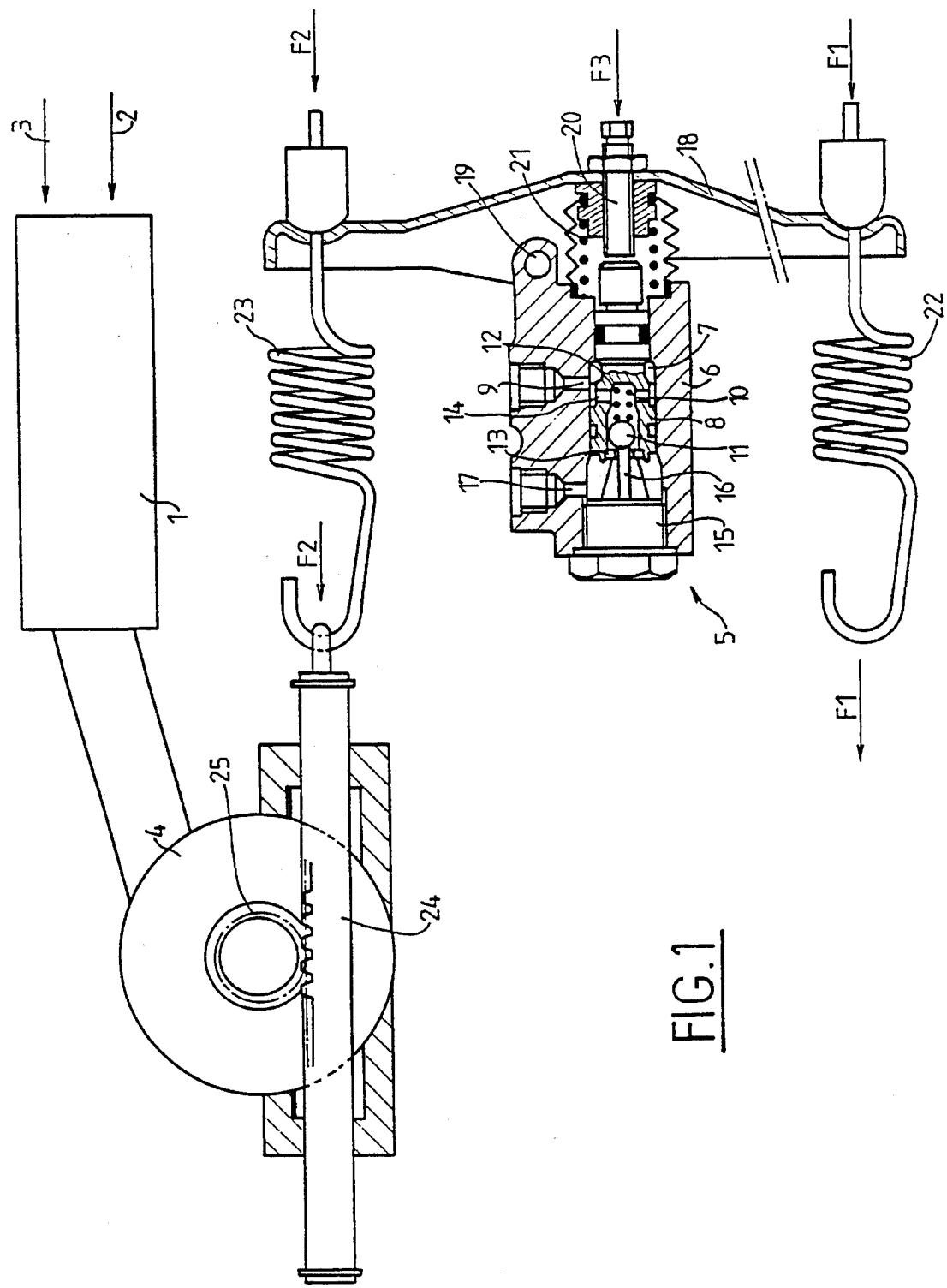
FIG. 1 is a diagram illustrating the device as a whole.

As illustrated in the drawing, an electro-hydraulic braking corrector according to the invention comprises an electrical braking power controller 1 which receives a first signal 2 representing the engaged gearbox ratio and a second signal 3 representing the torque of an electric motor that moves or propels the vehicle. The electro-hydraulic braking corrector also includes a torque motor 4, controlled by the power controller 1, and a braking compensator 5.

The braking compensator 5 includes a body 6 that features a bore hole 7 in which a staged piston 8 is slidably mounted. The staged piston 8 includes a small diameter portion and a large diameter portion. The bore hole 7 has portions with diameters conforming to the piston diameters. The body 6 has a lateral port 9 connected to the master cylinder of the vehicle braking system. This lateral port is positioned opposite the small-diameter portion of piston 8.

The staged piston 8 includes a cavity 10 that receives a valve 11. The valve 11 is biased by a spring 12 which tends to keep the valve 11 in place on a valve seat 13 that is integral with the piston 8. Radially extending openings 14, provided in the small-diameter part of the staged piston 8, establish fluid communication between an internal cavity 10 and bore hole 7. One end of the bore hole 7 is closed off by a stopper 15 on which is attached an axial push button or push rod 16 suitable for lifting the valve 11 from the valve seat 13 against the bias of the spring 12. At the extremity of that push rod 16, the body 6 has another lateral port 17 to which is connected a utilization line that in turn is linked to the braking circuit.

A link 18 is articulated on the body 6 for pivotal movement about a pivot pin 19. The link 18 bears a second push button or push rod 20 that can work or bear upon the end of staged piston 8 against the action exerted by a spring 21. One of the ends of this link 18 is tied or connected by a first connector spring 22 to an axle of the vehicle. Thus the link 18 receives the load information from that axle. The other end of the link 19 is tied or connected by a second connector spring 23 to a gear rack 24. The gear rack 24 engages a pinon 25 which is clamped or otherwise connected to the shaft of the torque motor 4, controlled by the power controller 1. The gear rack delivers an input to the compensator 5 which is a function of the braking torque of the electric motor that propels the vehicle.

When the compensator 5 is at rest, the valve 11 is removed from its seat 13 and the hydraulic pressure in the braking circuit is the same as the hydraulic pressure prevailing in the brake system's hydraulic master cylinder. When the effort exerted upon the brake pedal increases, the pressure in the braking circuit increases and the pressure acting on the staged piston 8 increases until the pressure exerts sufficient force to overcome a force F3, exerted by the link 18 upon the end of said staged piston 8. The piston 8 is then moved to the right in the FIG. 1 and the valve 11 closes. At this point the compensator 5 goes into action. A new or further increase in the pressure in the master cylinder causes the piston 8 to be moved to the left thereby reestablishing hydraulic communication between the ports 9 and 17. That communication permits a new increase in the hydraulic pressure in the braking system. However, instantaneously with that pressure increase, the piston 8 is moved to the right, thus closing the valve 11. The piston 8 is then in the same position (valve closed) as it was when the compensator began action. But the pressure in the braking circuit increases with relation to the first closing of the valve. During the pressure rise phase, the piston 8 oscillates around a balanced position. As a result of a succession of openings and closings of the valve 11, the pressure in the braking circuit increases but less so than the pressure in the master cylinder.

Now, a force F3 is exerted on the piston 8, which force F3 is the result of force F1 exerted on the link 18 by the first connector spring 22 and of force F2 exerted on the link 18 by the second connector spring 23.

We now have:

$$F3 = \frac{R1 * F1 - R2 * F2}{R3}$$

In the foregoing equation, R1, R2, and R3 are the lengths of the lever arms of the forces F1, F2, F2, with respect to the articulation axis 19.

If F1, representing the load on the axle increases, or if F2, representing the braking torque of the electric motor that propels the vehicle, diminishes, then the corrector increases the pressure in the hydraulic braking circuit, and thus increases the effectiveness of the latter. If F1 diminishes or if F2 increases, the corrector diminishes the pressure in the hydraulic braking circuit, and thus the effectiveness of the latter.

Figure 2:
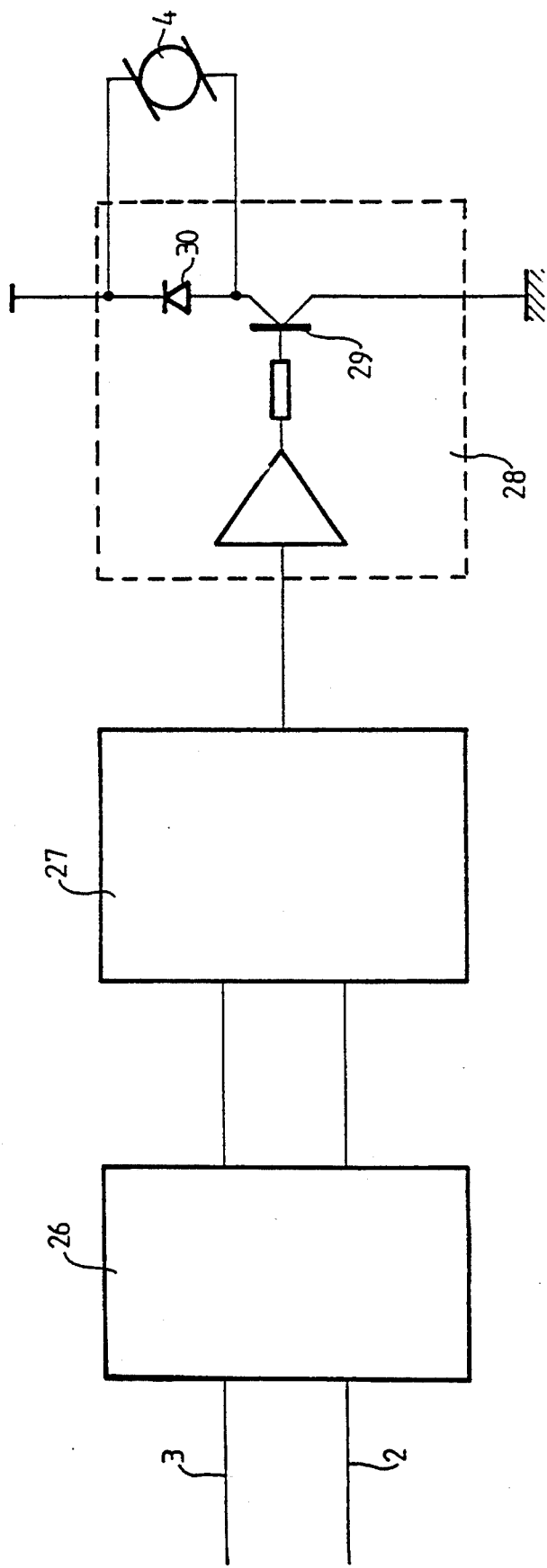
FIG. 2 is a diagram of the control box for regulating the hydraulic braking action.

In FIG. 2, we can see one embodiment of implementing unballasting power controller 1. The power controller 1 may include a shaping circuit 26, a calculator 27, and a power circuit 28. The calculator 27 evaluates the electrical braking force as a function of the engine operating rate and the engaged gear box ratio and furnishes an instruction value that is proportional to that force. The power circuit 28 furnishes a current that is proportional to that instruction value. This power circuit 28 can, for example, be made up of a transistor-equipped chopper 29 and a free wheeling diode 30, whose cyclic ratio (conduction time, cycle time) is proportional to the instruction value.

Figure 3:
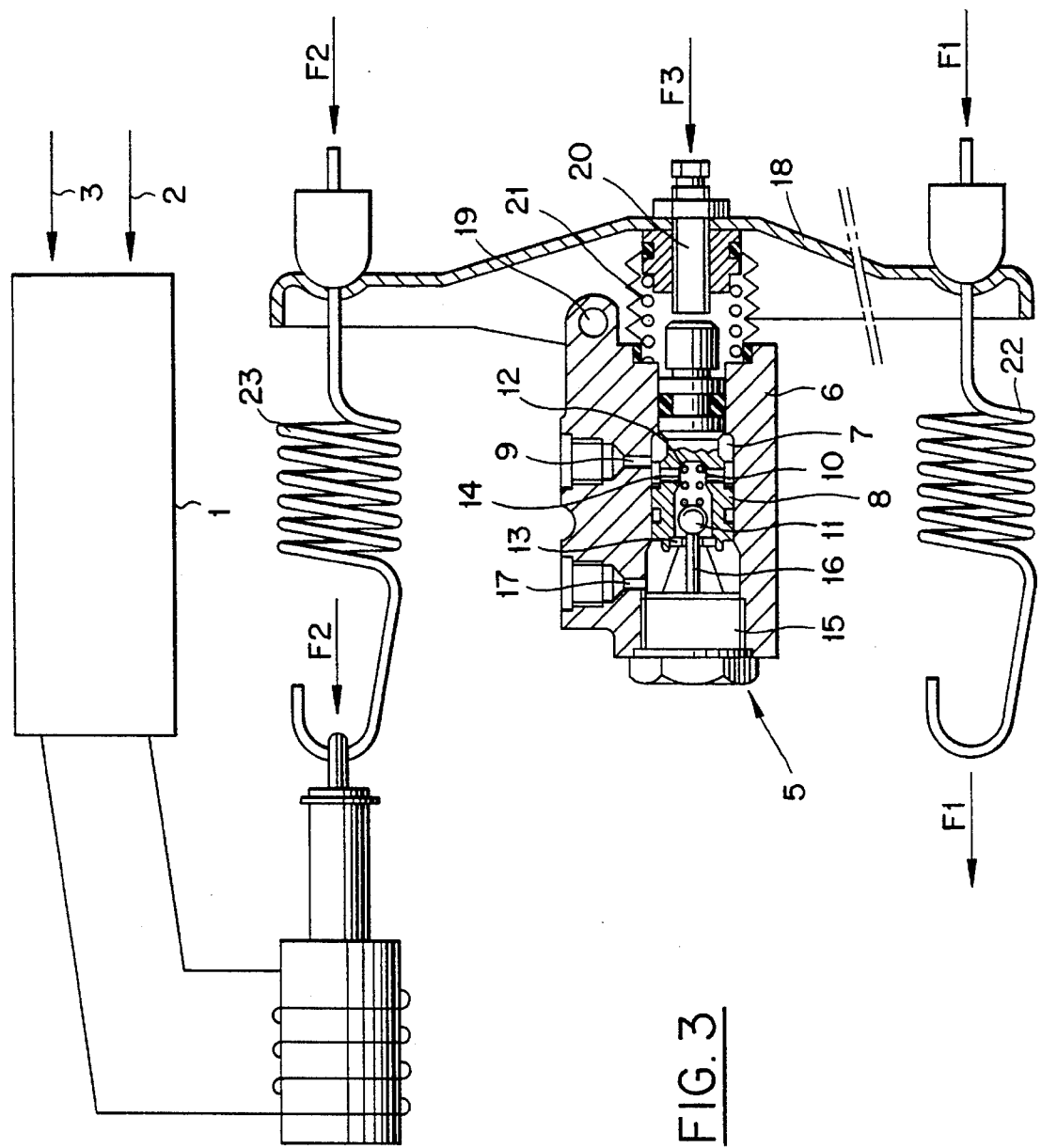
FIG. 3 is a diagram illustrating a second embodiment.

It goes without saying that this invention must not be considered to be restricted to the manner of implementation described and represented but, on the contrary, covers all variations, substitutions and equivalents thereof. Thus, for example, the torque motor 4, the pinon 25, and the gear rack 24 could be replaced by a proportional electromagnet (see FIG. 3). The instructions furnished by the calculator 27 would serve to determine the position of the plunger piston of the electromagnet with the plunger piston being tied to one of the ends of the link of compensator 5 by a spring.

It should now be apparent that an electro-hydraulic braking corrector according to the present invention overcomes the problems associated with the prior art. Moreover, it will be apparent to those skilled in the art that there are numerous modifications, variations, substitutions and equivalents for features of the invention which do not materially depart from the spirit and scope of this invention. Accordingly, it is expressly intended that all such modifications, variations, substitutions, and equivalents which fall within the spirit and scope of the invention as defined by the appended claims be embraced thereby.

What is claimed is:

1. Electro-hydraulic braking corrector for an electrically-powered vehicle, comprising:

means for sensing the braking torque of an electric propulsion motor;

means for modifying the hydraulic pressure exerted by a braking system as a function of the sensed braking torque of the electric propulsion motor, being connected to the means for sensing the braking torque;

wherein the means for modifying the hydraulic braking pressure as a function of the braking torque of the electric motor comprises means that is mobile as a function of said sensed braking torque, and a servo-controlled braking compensator operable for connection in the brake system between a master cylinder and a slave cylinder, and connected to the mobile means; and wherein the compensator is connected to an articulated link having two ends, one end of the link being connected to the vehicle suspension by a first spring and the other end of the link being connected to said mobile means by a second spring.

2. A braking corrector according to claim 1, wherein said mobile means comprises a motor having a shaft, a power controller means for controlling the motor as a function of the braking force of the electric motor, a pinion carried on the motor shaft, and a gear rack engaged by the pinion and connected to the second spring.

3. A braking corrector according to claim 2, wherein the power controller means comprises a shaping circuit, a calculator means for evaluating the electrical braking force as a function of the electrical braking torque and the engaged gear box ratio, and furnishing an instruction value proportional to said force, and a power circuit which furnishes a current that is proportional to that instruction value.

4. A braking corrector according to claim 1 wherein said mobile means comprises an electromagnet with proportional control, controlled by a power controller means as a function of the braking torque of the electric motor.

* * * * *